US009367354B1

(12) United States Patent
Ramsden-Pogue

(10) Patent No.: US 9,367,354 B1
(45) Date of Patent: Jun. 14, 2016

(54) QUEUED WORKLOAD SERVICE IN A MULTI TENANT ENVIRONMENT

(75) Inventor: Joshua D. Ramsden-Pogue, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 934 days.

(21) Appl. No.: 13/311,284

(22) Filed: Dec. 5, 2011

(51) Int. Cl.
*G06F 9/50* (2006.01)
*G06F 9/46* (2006.01)

(52) U.S. Cl.
CPC ............... *G06F 9/50* (2013.01); *G06F 9/5027* (2013.01); *G06F 9/5072* (2013.01)

(58) Field of Classification Search
None
See application file for complete search history.

(56) References Cited

U.S. PATENT DOCUMENTS

| 5,640,563 | A | * | 6/1997 | Carmon | 718/102 |
| 2008/0320482 | A1 | * | 12/2008 | Dawson et al. | 718/104 |
| 2012/0290725 | A1 | * | 11/2012 | Podila | 709/226 |

* cited by examiner

*Primary Examiner* — Eric C Wai
(74) *Attorney, Agent, or Firm* — Hogan Lovelis US LLP

(57) ABSTRACT

Tasks to be performed for a user can be outsourced to a workload service operable to process those types of tasks. Information for the tasks, such as code to be executed and data to be processed, can be stored to a queue for the workload service. The workload service can pull the task when an appropriate resource is available and provide the result to the user. The user can be charged only for the approximate time of the processing, without need to obtain the resource for an extended period of time resulting in unused capacity. The user can take advantage of queuing, data, and code storage services whereby tasks can contain pointers to code, data, and other information needed for a task. The workload service can pre-load the supporting code or information needed to provide an environment in which code of the type for the user task can be executed.

26 Claims, 5 Drawing Sheets

QUEUED WORKLOAD SERVICE IN A MULTI TENANT ENVIRONMENT

BACKGROUND

As an increasing number of applications and services are being made available over networks such as the Internet, an increasing number of content, application, and service providers are turning to technologies such as remote resource sharing and cloud computing. Cloud computing, in general, is an approach to providing access to electronic resources through services, such as Web services, where the hardware and software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources.

In many environments, a customer utilizing a cloud resource, such as a virtual server, must still obtain dedicated access to that server for at least a period of time. For example, certain cloud vendors charge for servers by the hour for an amount of resource capacity, and the customer must pay for that hour of capacity independent of how much capacity the customer actually utilizes. Such an approach can be particularly problematic when a customer has scheduled jobs or tasks that can occur concurrently, as the customer must obtain enough capacity to handle the concurrent tasks even though the capacity will be largely unused during other periods of time. Certain systems enable a customer to sell at least a portion of the resource capacity that has been provisioned for that customer to one or more other users, but such an approach generally enables those other users to obtain that capacity for a period of time that might prevent the customer from being able to utilize the capacity when needed. Further, the customer might have code that the customer wants executed on the resource, and the code would have to be reinstalled and a server or instance restarted each time the customer takes the resource back from another customer.

BRIEF DESCRIPTION OF THE DRAWINGS

Various embodiments in accordance with the present disclosure will be described with reference to the drawings, in which.

DETAILED DESCRIPTION

Figure 1:
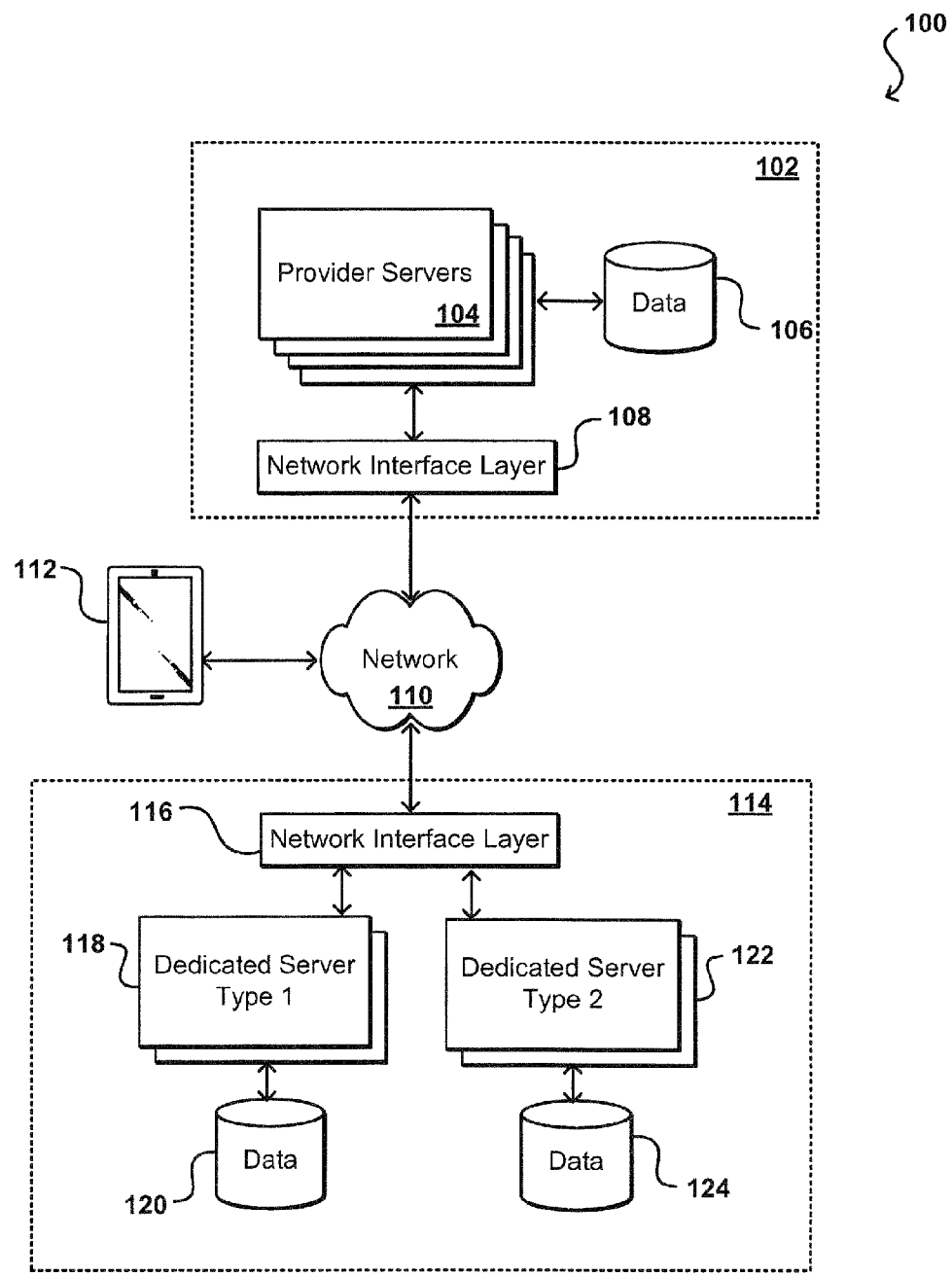
FIG. 1 illustrates an example environment in which various embodiments can be implemented.

Systems and methods in accordance with various embodiments of the present disclosure may overcome one or more of the aforementioned and other deficiencies experienced in conventional approaches to executing tasks in an electronic environment. In particular, various embodiments enable users to prevent contention on various resources while being able to perform various jobs or tasks from a single server. Further, the users can be being charged at a much more granular rate than is available through conventional providers of electronic resources. Electronic resources can be any appropriate resources, such as may be shared and/or multi-tenant resources, where at least a portion of those resources can be accessible to one or more parties other than a provider of those resources. These resources can include, for example, resources for processing, data storage, load balancing, database hosting, mapping services, parallel data processing, and various other services or systems that can manage an application environment or other such grouping or resources. An additional benefit of various embodiments is that users can avoid significant downtime due to startup and shutdown, or other such activities, on the virtual resources themselves.

In one embodiment, a workload service can offer at least one type of server that can be preloaded with code to perform a certain type of task and available to users at all times. Being used a majority of the time from a CPU perspective helps to generate revenue a significant portion of the time for the resource provider. Further, users can have their work performed by the server in singular jobs or tasks, which can be queued or properly balanced to ensure a small backlog of work and can enable users to be charged for only the approximate amount of time needed to process each job. A user can select one or more jobs that might normally be executed on a dedicated server for that user, and can be performed asynchronously to maximize resource usage and reduce cost.

In at least some embodiments, the workload service can enable a user to pre-load code, supporting files, and other information in at least one specified format to be queued by the workload service (or a separate queuing service, for example) until the resources are available to process the corresponding job. After processing, the user can receive back the results and the code and files can either be stored for subsequent use or deleted by the workload service. In at least some embodiments, a data service or other data source can also be available to the workload service such that the workload service can run the provided code on the appropriate data when the job reaches the "top" of the workload queue. As discussed, a virtual server for processing the job can be pre-loaded with the necessary supporting software for code of a particular type. A monitoring service or component can track how long the virtual server is utilized, how much processing capacity is used, etc., and can charge the user for the appropriate amount of usage.

In some embodiments, code to be executed can be dynamically generated and loaded as needed, instead of pre-loading and storing the code. The high priority loading can come with an associated higher cost, but can enable more flexibility in the code that is provided. For example, the code might be different between instances as appropriate. Further, loading supporting code just before it is needed, instead of loading the code well in advance, helps to ensure that the most current version is available.

Various other functions and advantages are described and suggested below as may be provided in accordance with the various embodiments.

FIG. 1 illustrates an example environment 100 in which various user tasks can be processed. In this example, a user (such as an application or service provider) can have a dedicated environment 102 wherein the user operates a bank of servers 104 operable to perform tasks and process jobs for any of a variety of different purposes. For example, a customer might utilize a computing device 112 to submit a request across at least one network 110 (e.g., a local area network, cellular network, or the Internet) that is received by one or more components or interfaces of a networking layer 108 and directed to an appropriate server 104 for processing. Although a portable computing device is shown, it should be understood that the computing device 112 can be any appropriate computing device capable of sending, receiving, and processing data and instructions, such as a tablet computer, smart phone, desktop computer, notebook computer, video game system, media player, and the like. The appropriate server 104 can access data from at least one appropriate data store 106 for use in processing the request.

As mentioned, the user typically will want to obtain enough processing capacity and other such resources to handle requests from multiple customers, as well as internal requests and tasks, for varying amounts of load. Oftentimes this requires the user to operate multiple servers 104 to perform these tasks, even though the servers may be less than fully occupied a majority of the time, coming at a significant additional expense for the user. In some cases, the user might decide to utilize resources offered by a cloud provider, or other provider of virtual, multi-tenant, or other such resources. In this example, the user can rent, lease, or purchase capacity from a resource provider environment 114, such as one or more virtual instances running on one or more servers or resources of a first type 118 and one or more servers or resources of a second type 122, each of which might utilize one or more respective data stores 120, 124 to store data or other such information. The user then can direct requests to the resource provider environment 114 for processing, which each can be received by an interface or component of a network interface layer 116 and directed to a virtual instance of the appropriate type.

Using conventional approaches, a user still must obtain the necessary amount of resources from the resource provider environment 114 for a minimum period of time. While the user can save money by not having to purchase and operate additional servers in the user environment 102, the user still must obtain dedicated capacity in the provider environment for a period of time. If the provider leases capacity by the hour, for example, the user would have to lease enough resources to process all jobs that hit once an hour, even if those jobs are processed concurrently in only a matter of a few minutes. Thus, the user is still paying for a significant amount of excess capacity. If a user wants to separate out functionality to have instances with specialized performance, even further capacity maybe needed.

Systems and methods in accordance with the various embodiments can instead enable a user to obtain processing or other resource capacity at a much more granular level, which can decrease costs for users and increase utilization of resources for various resource providers. A user can engage a queued workload service or other such system or entity to obtain job-specific processing capability. A user can provide a request including code to be executed for a job (or task, etc.) along with the data to be processed as part of the job, and the request can be directed to a resource instance having supporting software pre-loaded such that the code can be executed and job processed without significant downtime or delay for installing software or otherwise engaging an environment. Upon completion of the job, the service can return the results back to the user (or send them to another designated recipient) and charge the user only for the amount of time or resources used to process the request. The jobs for the various users can be queued, such that the jobs can be processed in order when the capacity becomes available.

Figure 2:
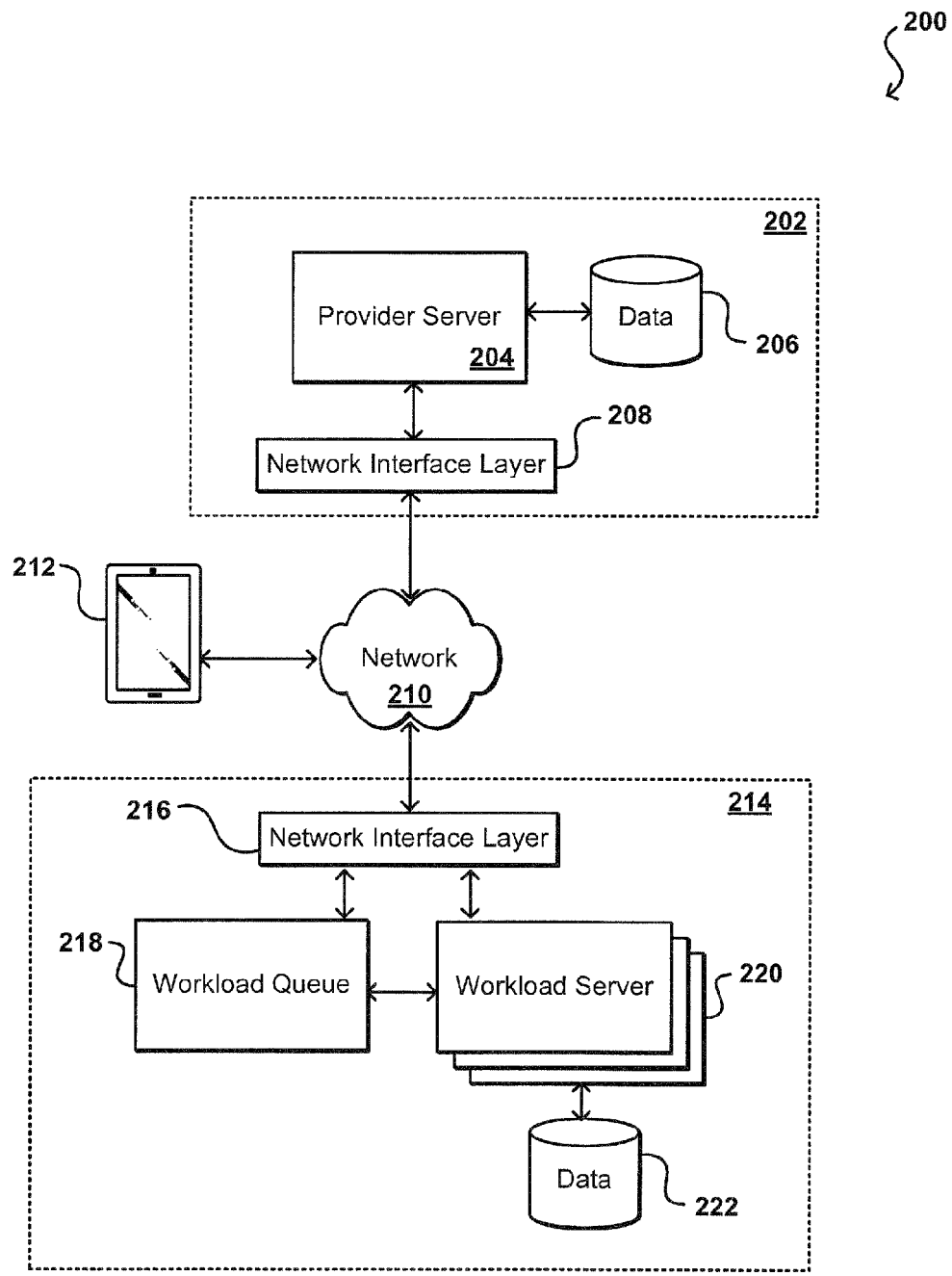
FIG. 2 illustrates an example environment in which a resource provider utilizes a workload queue for one or more customers that can be used in accordance with various embodiments.

FIG. 2 illustrates an example of an environment 200 in which such aspects can be implemented in accordance with various embodiments. In this example, a customer (or other end user, provider employee, etc.) is again able to use a computing device 212 to submit a request across at least one appropriate network 210 to be received by a network interface layer 208 of a user environment 202. The user can be any appropriate type of user, such as a software developer, a Web site operator, or an application, content, or service provider. For purposes of this example, the user will be considered to be a service provider. In this example, however, the user environment includes a significantly smaller number of servers 204 than was required in the environment of FIG. 1, as the service provider is able to have jobs processed by at least one resource provider. For example, a provider server 204 might process a request received from the customer 212 (or otherwise generated) and generate a workflow that includes one or more tasks or jobs to be processed or performed in order to obtain results for the request.

For one or more of the tasks of the workflow, the service provider might send information to an appropriate resource provider to enable a resource of the resource provider to process the task. For example, the service provider might generate workflows that include a set number of types of task (at least that will be handled by an outside service). The service provider can work with the resource provider to obtain access to a type of resource, such as a workload server 220, able to process each particular type of task. For example, a user might utilize a first type of resource to transform data, a second type of resource to perform a calculation, and a third type of resource to perform another such operation. The service provider can send information, such as code, files, and/or data, to the appropriate resource to have each of the tasks performed as needed.

The information can be received to an appropriate component (such as an appropriate Web programming interface ("API")) of a network interface layer 216 to be directed to the appropriate resource type for processing. In at least some embodiments, the information for a received task will be temporarily stored in at least one workload queue 218. There can be one workload queue for a resource provider environment 214, one per type of resource, one per type of task, or any other appropriate selection. The information can be stored in the workload queue until a resource of the appropriate type and with the necessary capacity becomes available. In some embodiments the workload queue will be part of a queuing service or system that can push out work as capacity becomes available, while in other embodiments the workload queue will act as a quasi-FIFO buffer wherein resources (e.g., workload servers) can pull tasks from the top of the queue, except where other priority applies as discussed elsewhere herein.

Such an approach enables a service provider to not have to operate a large group of dedicated machines. Using a service-oriented architecture-based approach, for example, a service provider can separate out various types of functionality that might be offered as part of a service and deliver the code for those types of functionality to at least one resource provider (or other outside service, etc.) when a task is to be performed. As discussed, in addition to the code the request can include any appropriate information, such as data files or references to outside resources such as database services or code services as discussed elsewhere herein. The resource provider can execute the code and return a result to an appropriate API or other address or interface of the user service. The result might be a modified data set or file, for example, or might simply be a notification that a task has completed. For example, if the task to be performed involves processing an image then the result back to the user service could be the processed image, or could be a notification that the image was processed and stored or delivered to a specified location, etc. In at least some embodiments, the task can be executed asynchronously such that the service can send off the information for the task and go on with other processes until the result of the task is received back. As discussed, the service provider might poll the resource provider or automatically receive a notification, among other such options.

An advantage of such an approach is that a significant portion of the work can be offloaded from a user machine to one or more remote services or virtual instances. The approach can be thought of as outsourcing threads to remote machines that are able to process a particular task and then return the result. For any portion of code that can be offloaded to another device for execution, a user can select to execute this code for some or all of the tasks of that type to a workload service, offered by a resource provider, in order to ensure that the user's machines are not overloaded, as well as to reduce the capacity of resources that the user must provide and support locally. For example, the user will not have to worry about a number of concurrent tasks of that type occupying a significant amount of memory, processing capacity, input/output operations per second (TOPS), or other such capacity on the user's local machine, which can negatively impact other processes executing on the user resources.

As discussed, the user can also be charged an amount that is proportional to the actual usage. For example, the usage of a resource can be billed per minute, per ten second interval, per second, or at any other appropriate period. There can also be different rate periods for different types of resources. For example, a ten second period of processing might cost more than a ten second period of data storage. Similarly, CPU time might be billed by the second while data storage capacity might be billed by the minute. Various other combinations and uses can be applied as well within the scope of various embodiments.

In some embodiments, a resource provider can enable a user to utilize temporary but highly accessible data caches as well. For example, an application might generate a number of temporary files while executing, downloading content, or performing another such action. A user might pay for a certain amount of space for static files, but might want additional storage available for these temporary files as needed. An approach in accordance with various embodiments enables a user to obtain temporary "micro-caches" or other relatively small amounts of temporary storage, and the user can be charged a rate proportional to the amount of storage used, which might be at a higher cost per unit of storage than conventional storage.

The length of the minimum time periods and cost of each period can also vary with the type of usage, type of user, type of application, or other such factor. For example, a relatively small user such as an individual developer or small Web site operator might not want to spend a lot on resources, or support a large server fleet, but will want to be able to support peak traffic. Due to the relatively low volume and potential impact on the resource provider, such a user might get a relatively low cost per unit time. In some embodiments, the small user might also have a different minimum period of time, such as a small amount to reduce cost to the user or a larger amount of time to offset the low cost per unit time. If, however, the relatively low traffic volume will attempt to perform very resource-intensive tasks, such as to query against a large dataset, then the user might have a larger cost per unit time because there will be a low volume of traffic, but the traffic will be very resource intensive. Various other pricing schemes can be applied based on various aspects of the user as should be apparent.

Other approaches can be used to price resource usage for larger users or use cases as well. For example, a user taking advantage of a workload service on a large scale might send code to be executed to a number of different locations to be processed by a number of different physical and/or virtual machines. Because these machines can have the supporting software available, however, there is no significant overhead for "spinning up" these machines or provisioning the appropriate instances as may be necessary with conventional server banks, etc. The large volume combined with the reduction of down time due to adding and removing conventional resources can result in pricing options that are significantly more attractive than conventional resources. Conventional approaches can have downtime for cloning instances, booting machines, and the like, which can be avoided by the approaches discussed herein. Approaches in accordance with the various embodiments can have the necessary environmental setup and support information spread across a variety of resource instances and environments, such that the user can utilize any of these resources by delivering the particular code portion to be executed and the data or information on which that code is to be executed.

An example of a type of workload that can take advantage of approaches in accordance with the various embodiments relates to a scheduling machine that operates for an entity. A scheduling process might perform various tasks on a scheduled basis, where different types of tasks have different frequencies of processing. For at least some examples, the timing of at least some of those processes might intersect, which could potentially cause an availability problem with the user system, or at least require the user to obtain more capacity than is normally needed in order to handle the intersecting processes. For example, if one process runs every hour and another process runs every fifteen minutes, each process running for about five minutes, the user might not appreciate having to have multiple machines active to handle the five minutes per hour where the two processes are both active. By utilizing a workload service, on the other hand, the scheduler can sent out requests for processing at the scheduled times without worry about consuming too many resources or purchasing excess capacity. The work can be performed by an appropriate resource instance and the result returned as appropriate. An advantage of various approaches discussed herein, however, is that the additional resource capacity can be obtained as needed, whether per a regular schedule or in response to randomly timed events, which enables dynamic capacity allocation while pricing based on an actual amount of usage.

Figure 3:
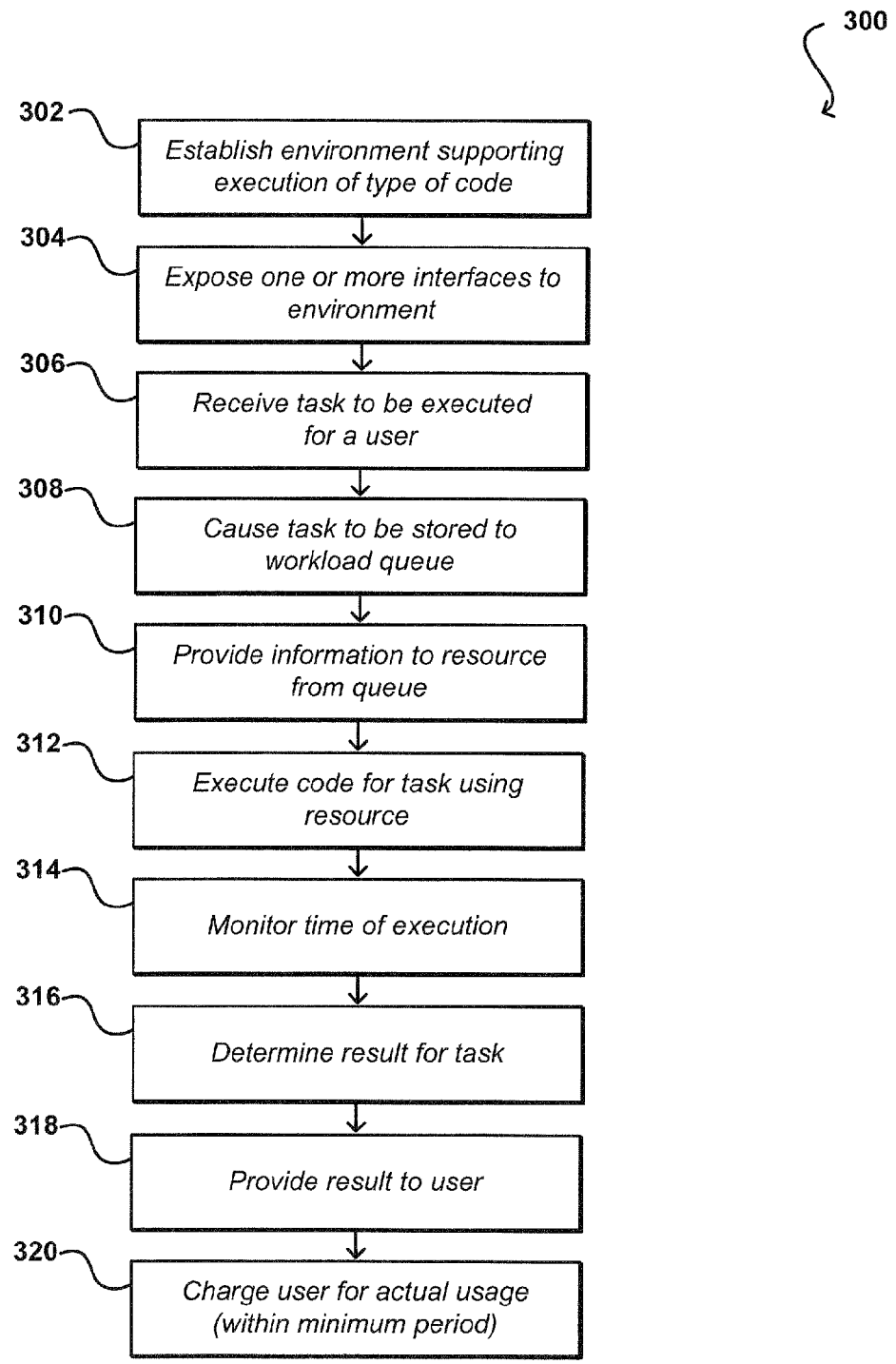
FIG. 3 illustrates an example process for executing workload instances that can be used in accordance with various embodiments.

FIG. 3 illustrates an example process 300 for utilizing a queued workload service that can be utilized in accordance with various embodiments. It should be understood for this and other processes disclosed herein that there can be additional, fewer, or alternative steps performed in similar or alternative orders, or in parallel, within the scope of the various embodiments unless otherwise stated. In this example, a resource provider offering a queued workload service establishes 302 at least one environment for executing a type of code using a set of resources. Each environment can include supporting software and configuration information for supporting a type of code such as Java®, C#, and the like. The environments can also support multiple versions of the same code, such as .NET 3.5, .NET 3.0, etc., which the user can specify in the task request if a particular version is desired. The environment can support the type of code at various locations using various types of resource, which can share or have dedicated environmental support in different embodiments. The resource provider can expose 304 one or more interfaces, such as Web service APIs, for use by users to submit tasks to the workload service.

Through the interface, a task can be received 306 for a user, where the task includes code to be executed and data or other information on which to execute the code. In some embodiments, once a type of code for a user is received to a service the code does not need to be subsequently sent with each task or request. Upon receiving the task, a component of the workload service can analyze information for the task, such as a type of code to be executed and type of resource needed, and can cause information for the task to be stored 308 in an appropriate workload queue. As mentioned, there can be one queue per type of resource, one queue per type of task, one queue per provider environment, or any other appropriate distribution. When a resource of the proper type and environment becomes available to handle the task, and the task is at the top of the workload queue (or otherwise the next task to be processed), the information for the task can be provided 310 to the resource. As mentioned, this can involve pushing the task to the resource from a queue monitoring component or having the available resource poll the queue for the next task. The resource can then begin to execute 312 the code on the data for the task. At least one resource monitoring component can monitor 314 the time for which the resource is dedicated to processing the task for the user. When the processing is complete, the resource can determine 316 the appropriate result and return 318 the result to the source of the task, such as a server associated with the user that generated the task. The user then can be charged 320 for the actual amount of resource time, within a determined minimum period of time, that was used to process the task.

Figure 4:
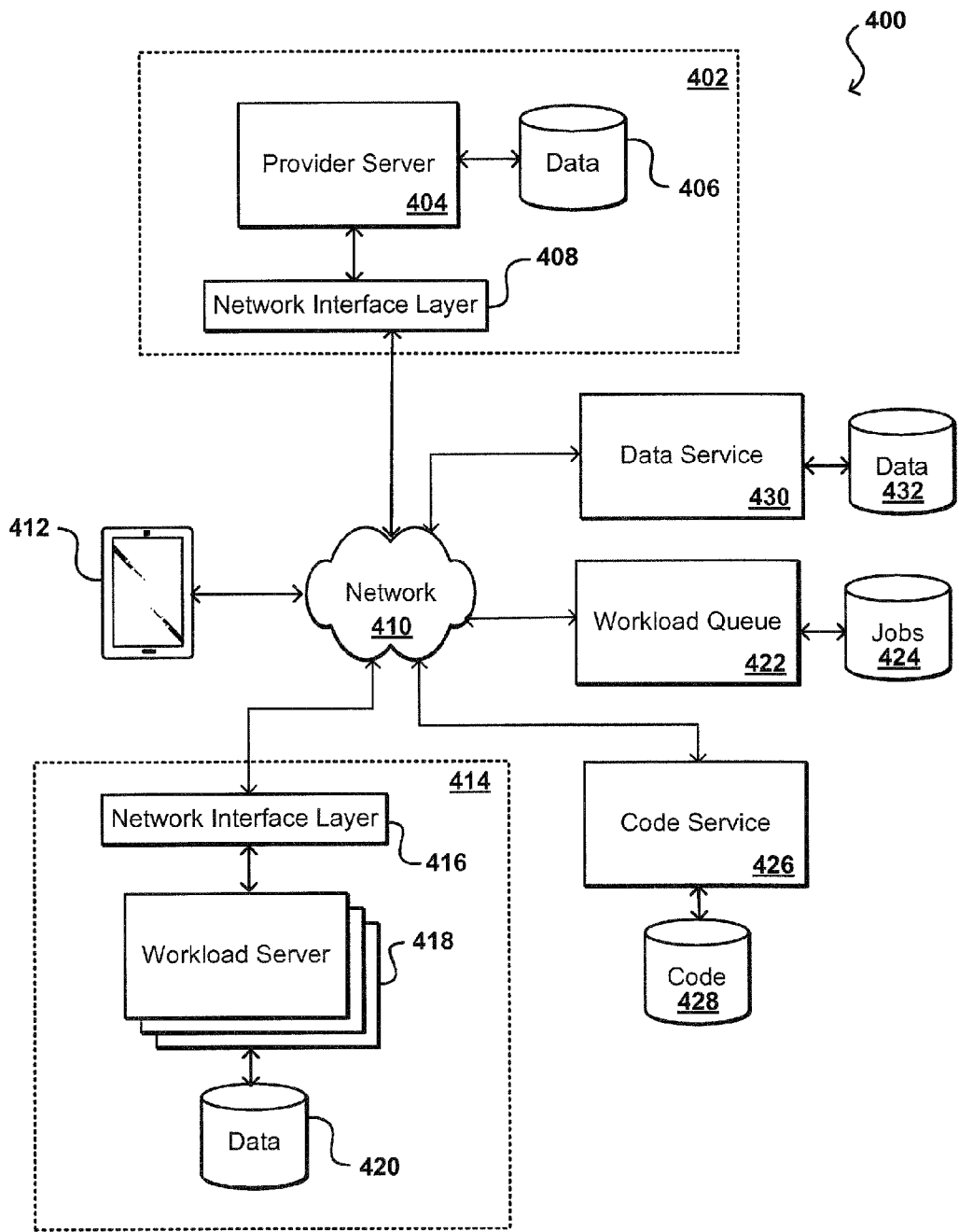
FIG. 4 illustrates an example environment including a queue service and code storage service that can be utilized in accordance with various embodiments.

In some embodiments, additional services can be utilized as well to provide enhanced functionality and/or flexibility. For example, FIG. 4 illustrates another example environment 400 in which various embodiments can be implemented. In this example, an application provider has an application provider environment 402 that includes at least a network interface layer 408, application provider server 404, and local data store 406 as discussed above. A customer using a client device 412 is able to communicate with the application provider environment 402 across at least one network 410, and the application provider is able to have one or more tasks performed by a workload service provider, which can include components such as a network interface layer 416, plurality of workload servers 418, and at least one data store 420 in the workload service provider environment 414. Functions and uses for such components can be similar to those set forth above for similar components.

In this example, however, the application provider and/or workload service provider is able to utilize and/or leverage various other components or services as well. For example, the information for a task might be stored to a workload queue 422 or queuing service that might be separate from the workload service environment 414. In some embodiments, multiple workload service providers might be able to serve similar requests, and a separate workload queue 422 can store information in a local data store 424 or other appropriate location, and can provide the tasks to the first workload service provider able to process a task, in at least some embodiments. In some embodiments, the queue service might be operated by the workload service provider but provided as a separate service from a separate environment. An advantage of a separate workload queue is that information for a task can be stored by the queue service, such that if there is a problem with processing the task by a workload resource, the task information will not be lost and can be redirected to another workload resource after a fault or error, maximum amount of delay, or other such occurrence.

The application provider can also utilize a separate code service 426 to store code to be used in executing various tasks. The code service 426 can store code for the application provider in an appropriate data store 428 or other such location, and can provide the code to a workload resource charged with processing a corresponding type of task. In at least some embodiments, the application provider can provide the code for a type of task ahead of time, and thus does not need to include the code with each request but can instead include a pointer to, or other identifier for, the code at the code service. An advantage of a code service is that the application provider can push new code or versions of code to the code service, such that the code service always has the most recent version. If a pending job has a pointer to the code, the pending job will be sure to be processed with the most recent code, even if the job was created when an earlier version was in use (unless otherwise configured, etc.). Such an approach is also advantageous over conventional approaches because all the resources can automatically pull the most recent version of code without having to deploy the code to each appropriate server, stop each server to deploy the code, and/or perform other such operations. Such functionality further minimizes resource downtime and increases resource utilization.

The application provider can obtain similar advantages by utilizing a data service 430 to provide data for the various tasks. For example, each task provided to a workload service can include a pointer to data stored in a data store 432 of the data service 430 instead of including the actual data. Such usage can be advantageous as the task can always obtain the most recent version of the data. Similarly, the workload service can request another copy of the data in case the data is corrupted or another such problem occurs. Supporting files for a type of task can also be stored by such a data service, such that the most recent version of these files can be obtained as well without deploying to all the appropriate servers, etc.

The use of code services and queuing services can help to support additional functionality as well. For example, a code service 426 might store pieces of code that can be utilized by multiple users. In the case of picture processing, a piece of code might be stored by the code service and offered to various users for a price. A user wanting to process a picture then would not have to provide code with a request, but can instead provide a pointer to the code stored by another user in the code service. Code for different functions can be made available through an electronic marketplace or other such interface, whereby users can select code to be used to perform various tasks. The code can already be supported by an environment of the workload service, such that the user does not need to worry about various environmental constraints, protocols, or other such information. The user can specify the code in a task and be charged for usage of that code, such as on a per usage basis, per time period basis, etc. In some embodiments, a user might specify pieces of code from different entities to perform various portions of a task, without the need to compile the code together, ensure compatibility, ensure contracts and agreements are being met, or perform any other such operations. When an updated version of the code is provided to the code service, the tasks pointing to that code can automatically obtain the current version.

Similarly, a queuing service can enable different levels of service to be provided at different pricing levels. As discussed, requests sent to a workload service are generally processed asynchronously. In some cases, different users might have different requirements for how quickly a result should be returned for a particular type of task. For example, higher priority tasks might be important to be performed as soon as a resource is available to handle the request, and as such can be charged more for processing than a lower priority request that can return a result whenever a resource is available and no higher priority tasks are pending. In order to ensure that the tasks actually get processed in a timely manner, however, in at least some embodiments lower priority tasks have a maximum delay period and after the delay period the task goes to the top of the queue if the task has not already been processed. Such an approach is advantageous for the user because lower priority tasks can be performed at a lower price, and beneficial to a workload service provider as the resources can obtain a very high usage rate on a consistent basis, and a potentially lower capacity of machines can be utilized to support the same workload.

Figure 5:
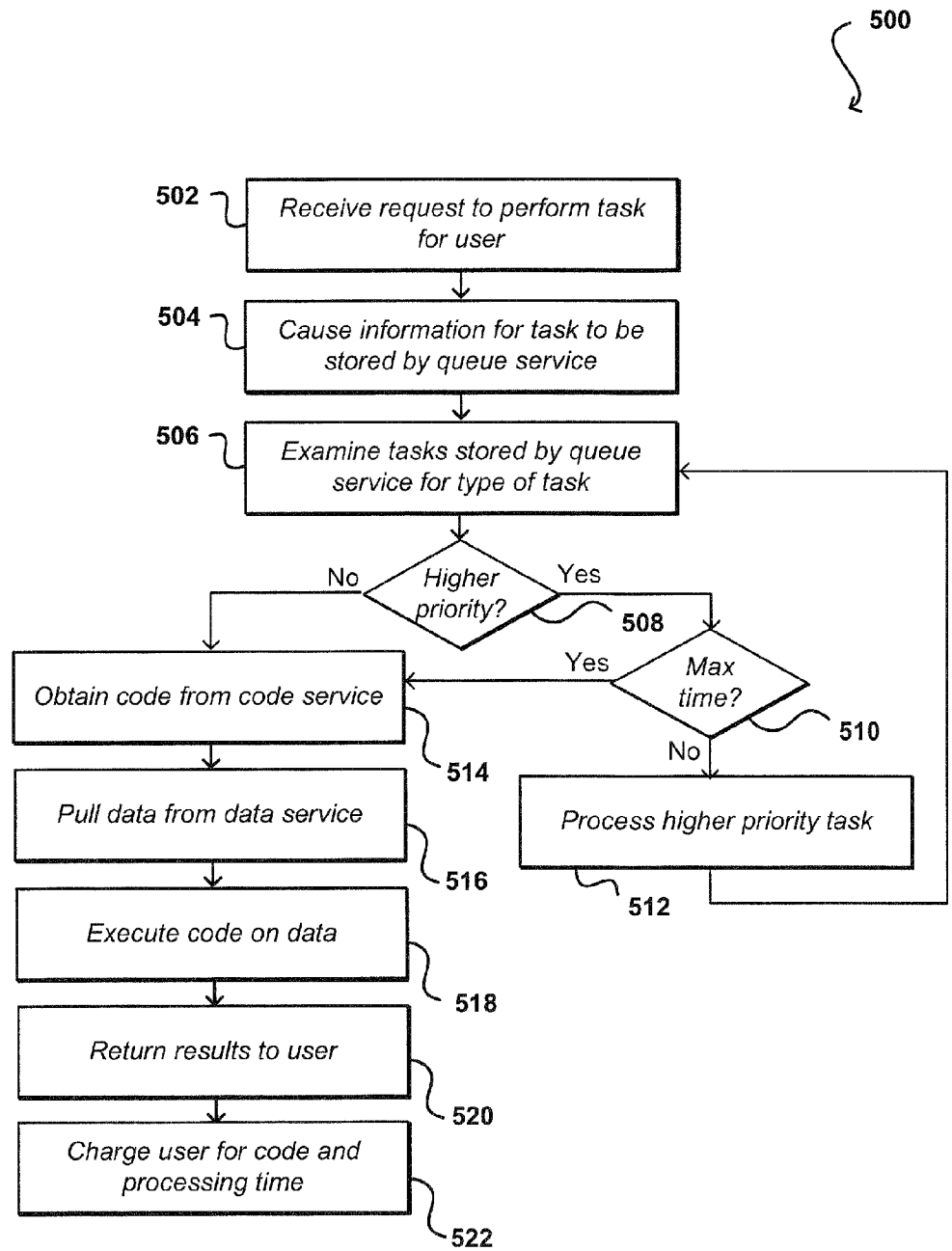
FIG. 5 illustrates an example process for providing other users access to code that can be executed using a workload service in accordance with various embodiments.

FIG. 5 illustrates another example process 500 for performing a task using a workload service that can be utilized in accordance with various embodiments. In this example, a request to perform a task is received 502 from a user. In this example, information for the task is caused to be stored 504 by a queuing service or other such entity. When capacity of a workload resource becomes available, the tasks stored by the queuing service can be examined to determine 506 the types of the pending tasks. As part of the queue analysis process, it can be determined 508 whether there are any higher priority tasks in the queue than the task for the user, even if the user task is otherwise at the top of the queue. If there is at least one higher priority task, a determination can be made 510 as to whether the user request has been pending for a maximum amount of delay. If not, at least one of the higher priority tasks can be processed 512 and the user task can remain in the queue.

At such time that the user task is at the top of the queue with no higher priority tasks, or the user task has been pending in the queue for the maximum amount of delay, the user task can be selected from the queue for processing. As part of the processing, the task can be analyzed to determine whether the task includes the code to be executed or a pointer to such code. If the task includes such a pointer, the pointer can be used to obtain 514 the appropriate code from a code service or other such source. Similarly, the task can be analyzed to determine whether the task request includes the data to be processed for the task or a pointer to the data. If the request includes such a pointer, the pointer can be used to pull 516 the data from an appropriate data service or other such source. Once the code and data are obtained, the code can be executed 518 on the data via at least one resource instance of the workload service. Once the results are obtained, the results (or a notification, etc.) can be returned 520 to the user. The user can then be charged 522 for the usage of the code from the code service as well as the processing time for the resource of the workload service. Other charges might accrue as well, such as costs for storing data in the data service, costs for storing code in the code service, etc.

As with other shared or multi-tenant environments, it can be desirable to implement security measures to prevent users from accessing other users' data or compromising one or more of the resources. In at least some embodiments, a user is granted with exclusive access to a machine or instance while the user is using the resource for processing and/or being charged for the processing. In some embodiments, the user has dedicated access to the machine or instance until the user acknowledges the results, indicates that the resource can be released, or provides another such notification. At such point, all access to that machine or instance by that user can be terminated, such as by revoking the credentials of that user for that instance. The instance then can receive a new set of credentials for a subsequent task, and only allow a corresponding user access to the instance. It should be understood that in at least many embodiments, the user is not getting direct, bare metal access to the physical resource, but access to a type of abstracted or virtual layer of resources, such that the user will have limited ability to compromise the physical resource. Further, since the user is providing and retrieving information for a task from a particular resource location, the user can isolate outside access using various permissions, as is known for other types of data transfer and processing.

At least some embodiments can provide one or more fail safes or exception handling processes for user tasks. For example, a user task might throw an exception during processing. The workload service can be configured to cause the code and data (or pointers to the same) to be stored in a temporary location, such that the task can be attempted again or the user can retrieve the data and/or code in case the user does not have another copy of the data, etc. The fact that the task did not complete successfully does not mean that the data is not valuable to the user or another such party. In addition to a retention mechanism, the workload service might include a notification system that notifies the user or another such party in the case of an exception. The system can detect exceptions and determine the source of the task to receive a notification, in case a new task should be submitted, the data should be retrieved, or another such action should take place. In some embodiments, the user could be charged for storing the data until the data is subsequently retrieved.

As will be appreciated, although a Web-based environment is often used herein for purposes of explanation, different environments may be used, as appropriate, to implement various embodiments. For example, a user can utilize a client device that can include any appropriate device operable to send and receive requests, messages, or information over an appropriate network and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In one example, the network includes the Internet, as the environment includes a Web server for receiving requests and serving content in response thereto, although for other networks an alternative device serving a similar purpose could be used as would be apparent to one of ordinary skill in the art. The illustrative environment also includes at least one application server and data store. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in, for example, FIG. 2. Thus, the depiction of the system 200 in FIG. 2 should be taken as being illustrative in nature, and not limiting to the scope of the disclosure.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate non-transitory media known or used in the art, including storage media and communication media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of processing a task for a user, comprising:

under control of one or more computer systems configured with executable instructions, retrieving supporting software that includes code to configure a resource of a plurality of resources to support processing of a type of task, the code being generated and loaded onto a server in a distributed computing environment to execute a type of code associated with the type of task, the plurality of resources being distributed in the distributed computing environment, the distributed computing environment being provided at least in part by a resource provider;

configuring the resource to execute the type of code associated with the type of task;

exposing an interface enabling a plurality of users to obtain access to the plurality of resources;

receiving a request from one of the plurality of users to process a task of the type of task, the request including information identifying the code of the type of code to be executed, data to be processed as part of the task, and a priority level;

storing the information for the task to a task queue;

determining, based at least in part on the priority level of the request, that the task is at a top of the task queue and there are no higher priority tasks of the type of task in the task queue;

pulling the information for the task from the task queue;

causing the code to be executed and the data to be processed for the task using the resource of the plurality of resources;

monitoring an amount of time for processing the task using the resource of the plurality of resources;

returning a result of the processing to the user; and charging the user an amount proportional to the monitored amount of processing time.

2. The computer-implemented method of claim 1, wherein the priority level of the task is specified by the request or determined by at least one of a type of the user or a type of account associated with the user.

3. The computer-implemented method of claim 1, wherein the amount the user is charged is further determined at least in part by the priority level of the task.

4. The computer-implemented method of claim 1, further comprising:

pulling the information for the task from the task queue when the task has been pending in the task queue for a maximum period of processing delay.

5. The computer-implemented method of claim 1, wherein configuring the plurality of resources to support processing of the type of task includes pre-loading software on a plurality of servers enabling the servers to execute a type of code associated with the type of task.

6. A computer-implemented method of providing task-specific resource capacity, comprising:

under control of one or more computer systems configured with executable instructions, retrieving supporting software that includes code to configure a resource of a plurality of resources to support processing of a type of task, the code being generated and loaded onto a server in a distributed computing environment to execute a type of code associated with the type of task, the plurality of resources being distributed in the distributed computing environment, the distributed computing environment being provided at least in part by a resource provider;

configuring the resource to execute the type of code associated with the type of task;

receiving a request to process a task of the type of task on behalf of a user, the request including information identifying the code of the type of code to be executed and data to be processed as part of the task;

causing the information for the task to be stored to a task queue;

determining that the task is a next task of the type of task in the task queue;

determining capacity of the plurality of resources is available to process the task;

pulling the information for the task from the task queue;

causing the code to be executed and the data to be processed for the task using the determined capacity of the resource of the plurality of resources;

upon completion of the task, returning a result of the task to the user; and charging the user an amount proportional to an amount of time needed to complete the task using the determined capacity.

7. The computer-implemented method of claim 6, wherein the plurality of resources includes resources configured to process tasks of different task types.

8. The computer-implemented method of claim 6, wherein the plurality of resources is operable to concurrently process multiple tasks from one or more users.

9. The computer-implemented method of claim 6, wherein the request identifying code to be executed includes at least one of including the code in the request or including a pointer to a location from which the code can be obtained.

10. The computer-implemented method of claim 6, wherein the request identifying data to be processed includes at least one of including the data in the request or including a pointer to a location from which the data can be obtained.

11. The computer-implemented method of claim 6, wherein the task queue is provided by a separate queuing service.

12. The computer-implemented method of claim 6, wherein the plurality of resources includes at least one of a plurality of physical servers or a plurality of virtual server instances.

13. The computer-implemented method of claim 6, wherein the user is granted dedicated access to the capacity during the processing, the dedicated access being revoked after the result is provided to the user or the user acknowledges receipt of the result.

14. The computer-implemented method of claim 13, wherein the dedicated access includes secure access to a set of dedicated resources.

15. The computer-implemented method of claim 6, further comprising:

pulling the information for the task from the task queue when a maximum period of delay has passed and sufficient capacity of the plurality of resources is available to process the task.

16. The computer-implemented method of claim 6, wherein the task has a priority level, and wherein the information for the task remains in the queue if a maximum period of delay has not passed and there is a higher priority task of the type of task in the task queue.

17. A computer-implemented method of processing a task, comprising:

retrieving supporting software that includes code to configure a resource of a plurality of resources to support processing of a type of task, the code being generated and loaded onto a server in a distributed computing environment to execute a type of code associated with the type of task, the plurality of resources being distributed in the distributed computing environment, the distributed computing environment being provided at least in part by a resource provider;

configuring the resource to execute the type of code associated with the type of task;

determining a task of the type of task to be performed as part of a set of tasks;

determining the code of the type of code to be executed and data to be processed as part of the task;

sending a request including information for the task to a workload service coupled to the plurality of resources, the request identifying the code of the type to be executed and the data to be processed as part of the task; and receiving a result of the task of the type after processing by the resource of the plurality of resources, the information for the task having been stored in a queue until sufficient capacity of the resource of the plurality of resources was available to process the task, wherein a user is able to obtain dedicated access to at least a portion of the plurality of resources for an approximate amount of time needed to process the task of the task type when the dedicated access is available, and wherein the user is charged for the dedicated access only for the approximate amount of time.

18. The computer-implemented method of claim 17, wherein the user is able to provide the code and the data with the request or provide a pointer to at least one location storing at least one of the code or the data.

19. The computer-implemented method of claim 18, wherein the code is provided by a code provider, the user being charged for use of the code.

20. The computer-implemented method of claim 17, wherein the user is able to submit multiple tasks of the same type or different types to be concurrently processed by the workload service.

21. A system for providing task-specific processing, comprising:

at least one processor; and memory including instructions that, when executed by the at least one processor, cause the system to:

retrieve supporting software that includes code to configure a resource of a plurality of resources to support processing of a type of task, the code being generated and loaded onto a server in a distributed computing environment to execute a type of code associated with the type of task, the plurality of resources being distributed in the distributed computing environment, the distributed computing environment being provided at least in part by a resource provider;

configure the resource to execute the type of code associated with the type of task;

receive a request to process a task of the type of task on behalf of a user, the request including information identifying the code of the type of code to be executed and data to be processed as part of the task;

cause the information for the task to be stored to a task queue;

determine that the task is a next task of the type of task in the task queue;

determine capacity of the plurality of resources is available to process the task;

pull the information for the task from the task queue; cause the code to be executed and the data to be processed for the task using the capacity of the resource of the plurality of resources;

upon completion of the task, return a result of the task to the user; and charge the user an amount proportional to an amount of time needed to complete the task using the capacity.

22. The system of claim 21, wherein the plurality of resources includes at least one of a plurality of physical servers and a plurality of virtual server instances.

23. The system of claim 21, wherein the user is granted dedicated access to the capacity during the processing, the dedicated access being revoked after the result is provided to the user or the user acknowledges receipt of the result.

24. A non-transitory computer-readable storage medium including instructions for processing a task for a user, the instructions when executed by at least one processor of a computing device causing the computing device to:

retrieve supporting software that includes code to configure a resource of a plurality of resources to support processing of a type of task, the code being generated and loaded onto a server in a distributed computing environment to execute a type of code associated with the type of task, the plurality of resources being distributed in the distributed computing environment, the distributed computing environment being provided at least in part by a resource provider;

configure the resource to execute the type of code associated with the type of task;

expose an interface enabling a plurality of users to obtain access to the plurality of resources;

receive a request from one of the plurality of users to process a task of the type of task, the request including information identifying the code of the type of code to be executed, data to be processed as part of the task, and a priority level;

store the information for the task to a task queue;

determine, based at least in part on the priority level of the request, that the task is at a top of the task queue and there are no higher priority tasks of the type of task in the task queue;

pull the information for the task from the task queue;

cause the code to be executed and the data to be processed for the task using the resource of the plurality of resources;

monitor an amount of time for processing the task using the resource of the plurality of resources;

return a result of the processing to the user; and charge the user an amount proportional to the monitored amount of processing time.

25. The non-transitory computer-readable storage medium of claim 24, wherein the priority level of the task is specified by the request or determined by at least one of a type of the user or a type of account associated with the user.

26. The non-transitory computer-readable storage medium of claim 24, wherein the amount the user is charged is further determined at least in part by the priority level of the task.

* * * * *